Feb. 20, 1951 A. BERTHIER ET AL 2,542,228
TRICHROMATIC SELECTIVE OPTICAL LIGHT DIVIDING DEVICE
Filed June 17, 1947
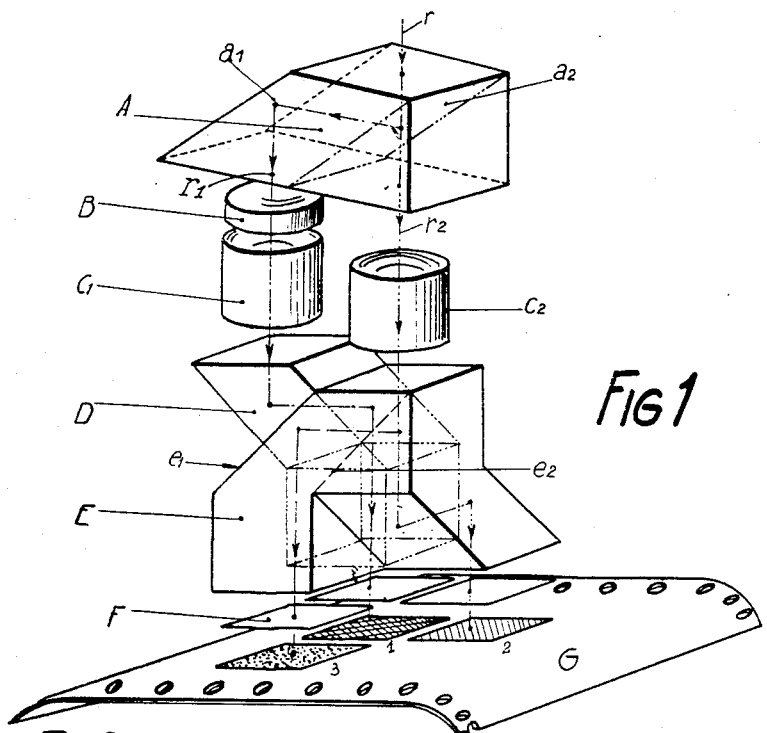
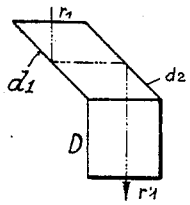
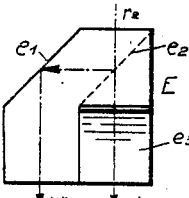
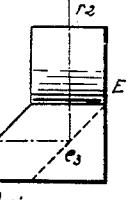
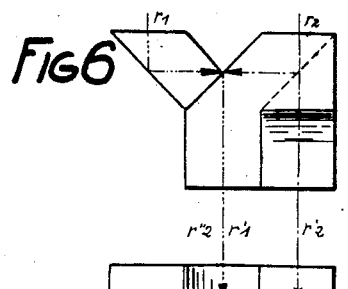
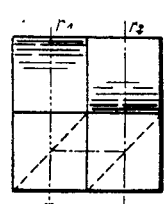
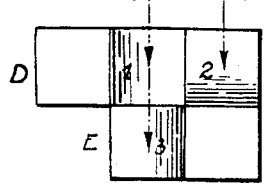
Inventors
ANDRÉ BERTHIER
ROGER DUMAS
ANDRÉ MARX
by their attorneys
Howson & Howson Patented Feb. 20, 1951

2,542,228

UNITED STATES PATENT OFFICE 2,542,228

TRICHROMATIC SELECTIVE OPTICAL LIGHT DIVIDING DEVICE

André Berthier, Paris, Roger Dumas, Boigneville, and André Marx, Cannes, France

Application June 17, 1947, Serial No. 755,196
In France July 11, 1946

2 Claims. (Cl. 88—1)

This invention has for its object an optical device whereby three monochrome exactly superposable pictures may be obtained.

Several devices were already proposed to obtain this result. None has been thoroughly successful in meeting the required conditions.

Many authors of previous systems pretended they could avoid the parallax or said it was a negligible element. Actually no previous system has ever succeeded in avoiding the parallax.

In many such systems, occultations take place, i. e. in some directions there are certain elements which mask other elements.

With most of the previous systems the pictures are not complete, e. g. the third image is only formed by marginal rays.

These different drawbacks are completely avoided with the new devices according to the invention which operates rigorously without parallax, gives three perfect and exactly superposable images and has several other advantages described hereinafter.

The novel device is characterized by the combination of a first prismatic system whereby the rays from two beam-receiving objectives are split in two portions, and a second prismatic system also subdividing the aforesaid beams in two portions so that three suitably shifted images are obtained while the luminous rays flow along equal paths into the glass.

Furthermore, the invention is characterized by particular arrangement of the second prismatic system resulting from the association of two blocks, one for producing a simple lateral displacement of the rays, the other for dividing the incoming beam into two distinct beams.

Other advantages and characteristics of the present invention will be made clear as the description hereinafter proceeds and from the inspection of the enclosed diagrammatical drawing shown by way of non-limiting example:

Fig. 1 shows a general perspective view of the system.

Figs. 2 and 3 are respectively a front and a side view of one of the prisms of the second prismatic unit.

Figures 4 and 5 are respectively a front and side view of the other prism of the second prismatic unit.

Figs. 6, 7 and 8 are three corresponding front, side and top views of the two assembled prisms of the second unit.

As shown in the drawing, the novel device comprises a first optical system constituted by a rhomboeder-prism combination A, having a reflecting outer surface $a_1$ and a semi-transparent inner surface $a_2$.

On the rear side of said prisms are two objectives $C_1$ and $C_2$ the focal length of which are rigorously identical. Both objectives are shifted with respect to the plane of the drawing.

A parallel sided glass B is inserted between the optical system A and objective $C_1$ to equalize the path, in the glass, of the rays penetrating into objective $C_1$ and those penetrating into objective $C_2$.

A second optical system formed by a rhomboid and prismatic block D and a rhombohedral-prism combination E is positioned behind the objective $C_1$ and behind objective $C_2$ respectively.

The block D is shown in Figs. 2 and 3 and has two parallel reflecting surfaces $d_1$—$d_2$.

Block E, Figs. 4 and 5, has a reflecting surface $e_1$, a semi-transparent surface $e_2$ within the prism block and two reflecting surfaces $e_3$ and $e_4$.

Both blocks are arranged in juxtaposition as shown in Fig. 8.

Three selecting filters F complete the system which operates as follows:

A luminous ray bundle $r$ penetrating into the first prism block A meets the semi-reflecting surface $a_2$ whereby the ray will be divided in two portions. One ray is reflected and directed toward surface $a_1$ where it is again reflected and leaves the prism in the direction $r_1$.

The other portion of the ray follows its straight path according to $r_2$.

Both rays $r_1$ and $r_2$ pass through the two objectives $c_1$, $c_2$.

The ray $r_1$ meeting prism D, is reflected by the two surfaces $d_1$ and $d_2$ in the direction $r'_1$ and forms an image I on a film G.

The ray $r_2$ meeting prism E engages the semi-reflecting surface $e_2$ whereby it is divided in two portions. The ray which passes through will be reflected by the two inclined faces $e_3$ and $e_4$ and travels in the direction $r'_2$ to form an image 2. The reflected portion is reflected once more on face $e_1$ and travels in the direction $r''_2$ forming an image 3.

All three images are positioned on the film as shown in Fig. 1.

Due to the arrangement of the prism blocks D, E the rays follow equal paths within the glass thereof.

The new device offers several other advantages, i. e.:

The trichromatic system works in the same manner as for black and white operations. It enables the adoption of different objective foci and the changing of focal lengths during its operation.

The three images are rigorously equal, which is very important for reproduction work.

The novel device may be efficiently used not only in motion pictures but also for photography and any other applicattion.

The above described arrangements are only given by way of example, and it is understood that various changes and modifications may be made in the structural details, forms, dimensions and materials employed within the scope of the appended claims without departing from the spirit and scope of the invention.

What we claim is:

1. In a trichromatic selective optical device in combination, a first objective system comprising a rhomboid-prism block presenting a totally reflecting surface and a semi-transparent face parallel to said reflecting surface, two objectives to the rear of said block, one objective receiving light transmitted through said semi-transparent surface, the other objective receiving light reflected from said semi-transparent surface and said reflecting surface and a second optical system comprising a rhomboid and prism block and a rhombohedral prism combination, the entrant surface of said second system facing said two objectives, said rhomboid-prism block of said second system having two parallel totally reflecting surfaces which are arranged to produce a lateral displacement of the reflected light from said first optical system and direct said light toward the exit face, said rhombohedral prism combination of the second system having a semi-transparent surface dividing the transmitted light from the first system and two reflecting surfaces causing said divided transmitted light to be displaced in parallel in different directions from the reflected light from said first optical system but parallel thereto.

2. In a trichromatic selective optical device in combination, a first optical system comprising a totally reflecting surface and a semi-transparent surface parallel to said first reflecting surface, said first system being arranged to divide an entering light-ray bundle, two objectives arranged to the rear of said first system with their axes extending in parallel, one of said objectives facing said first reflecting surface, the other objective facing said first semi-transparent surface, and a second optical system comprising two juxtaposed transparent prismatic blocks having substantially parallel entrance and exit faces, the first of said blocks having two parallel totally reflecting surfaces which are arranged to produce a lateral displacement of the reflected light from said first optical system and direct said light toward the exit face, the second block having a semi-transparent surface for dividing the entering light ray, one-half being reflected and the other half transmitted, said second prismatic block having a first totally reflecting surface to direct the reflected light ray toward the exit face, said second prismatic block further having second and third totally reflecting surfaces arranged to receive the transmitted light ray which traversed said semi-transparent surface of said second block to direct the ray toward the exit face whereby the two images projected by the second prismatic block of said second optical system are displaced laterally, however in perpendicular directions.

ANDRÉ BERTHIER.
ROGER DUMAS.
ANDRÉ MARX.

REFERENCES CITED

The following references are of record in the file of this patent:

UNITED STATES PATENTS

| Number | Name | Date |
|---|---|---|
| 1,765,882 | Romer | June 24, 1930 |
| 2,281,607 | Thomas | May 5, 1942 |
| 2,315,783 | Gilmore | Apr. 6, 1943 |